United States Patent [19]

BEST AVAILABLE COPY

[11] 3,895,192

Angner et al.

[45] July 15, 1975

[54] TELEPHONE LINE CIRCUIT HOLD CONTROL ARRANGEMENT

[75] Inventors: Ronald Joseph Angner, Freehold; Alexander Feiner, Rumson, both of N.J.

[73] Assignee: Bell Telephone Laboratories, Incorporated, Murray Hill, N.J.

[22] Filed: July 25, 1974

[21] Appl. No.: 491,822

[52] U.S. Cl. .................................. 179/99; 179/81 R

[51] Int. Cl.[2] ........................................... H04M 1/00

[58] Field of Search ................. 179/81 R, 99, 18 FA

[56] References Cited

UNITED STATES PATENTS

| | | | |
|---|---|---|---|
| 3,436,488 | 4/1969 | Barbato et al. | 179/99 |
| 3,748,405 | 7/1973 | Saba | 179/99 |
| 3,764,752 | 10/1973 | Yachabach | 179/99 |
| 3,840,710 | 10/1974 | Limiero et al. | 179/99 |

*Primary Examiner*—Kathleen H. Claffy
*Assistant Examiner*—Thomas D'Amico
*Attorney, Agent, or Firm*—David H. Tannenbaum

[57] ABSTRACT

There is disclosed a line circuit for use in the path between a switching machine and a telephone station for controlling the hold function. The hold control circuit is arranged to respond to a momentary transient signal on the communication leads from the telephone station and to the presence or absence of a signal on the A lead from the station for establishing either the hold state or the disconnect state of the line circuit. Structure is disclosed for timing the release of the hold function on communication lead open conditions with the time delay dependent upon the insertion of a diode in series with the timing capacitor to adjust the voltage across the capacitor.

5 Claims, 3 Drawing Figures

FIG. 2

| STATE | RELAY | |
|---|---|---|
| | B | C |
| IDLE | 0 | 0 |
| RING | 0 | 1 |
| BUSY | 1 | 0 |
| HOLD | 1 | 1 |

FIG. 3

| ELEMENT | VALUE |
|---|---|
| R1 | 100Ω |
| R2 | 6.8KΩ |
| R3 | 51KΩ |
| R4 | 1KΩ |
| R5 | 2KΩ |
| R6 | .51MΩ |
| R7 | 5.1MΩ |
| R8 | .1MΩ |
| R9 | 3MΩ |
| R10 | 1.8KΩ |
| R11 | 6.8KΩ |
| R12 | 82KΩ |
| R13 | 22KΩ |
| R14 | 18KΩ |
| R15 | 5.1KΩ |
| R16 | 20KΩ |
| R17 | 10KΩ |
| R18 | 5.6KΩ |
| R19 | 500Ω |
| R20 | 1500Ω |
| R21 | 470Ω |
| R22 | 10KΩ |
| R23 | 500Ω |
| C1 | 1μf |
| C2 | 60μf |
| C3 | .5μf |
| C4 | 1μf |
| C5 | .1μf |

TELEPHONE LINE CIRCUIT HOLD CONTROL ARRANGEMENT

FIELD OF THE INVENTION

This invention relates generally to an improved key telephone line circuit and, more particularly, to a hold control arrangement for use in such a circuit.

BACKGROUND OF THE INVENTION

A telephone line circuit is a basic part of a telephone network in that it provides the necessary interface between a subscriber's set and the switching equipment at central switching points such as PBXs or central offices. More specifically, a telephone line circuit performs those supervisory and control functions that are incident to the establishment and maintenance of a connection between a central switching point and one or more local subscribers' telephone sets. One such control function is the hold function where a line is kept in an inactive but waiting condition. When the hold function is provided means must be provided for enabling the hold circuit from signals sent from the station as well as for manually releasing the line from the hold condition. In addition, circuitry must be provided which is operative under central office control to release the held line.

U.S. Pat. No. 3,436,488, issued Apr. 1, 1969 to Robert E. Barbato and David T. Davis, is a typical example of a line circuit where a line relay is used to detect the difference between the hold enable signal and the disconnect signal as generated by the telephone station. Typically, the hold enable signal as seen by the line circuit is a release of the ground on the 'A' lead coupled with the continuation of current flowing over the T and R communication leads between the line circuit and the station network. Such a signal results because the operation of the hold key at the telephone station serves to open the 'A' lead before the network is disconnected. Thus, in prior art line circuits, the release of the 'A' lead causes the connection of a line (L) relay into the communication leads in series between the switching network and the station set for the purpose of detecting the continued flow of current through the line circuit. If the line relay operates indicating a continued flow of current through the station network (off-hook), the line circuit goes into the hold condition and the line relay is maintained operated by current flowing from the switching machine. If, on the other hand, the line relay does not operate (station going from off-hook to on-hook), then the absence of an 'A' lead ground indicates that the station has disconnected and the line circuit goes into the disconnect condition.

In our copending application, R. J. Angner-A. Feiner, Ser. No. 491,823, filed July 25, 1974, we have disclosed a line circuit which operates on the transient response generated when the station makes a transition from off-hook to on-hook or from on-hook to off-hook. This line circuit is connected in parallel across the communication leads from the switching network to the telephone set. The parallel or shunt detector operates to detect ac current flowing for ringing control, while also detecting the transient response of the system caused when the telephone station makes a transition from on-hook to off-hook or from off-hook to on-hook.

Detection of ringing signals is accomplished by allowing the ac current generated by the ringing voltage to pass through and operate the line relay L in much the same manner as in prior line circuits. Operation of the L relay places the line circuit in the ringing condition.

The L relay is capacitive-coupled across the T and R communication leads so that when the line circuit is in the talking or busy condition the L relay is unoperated. When the station makes a transition from off-hook to on-hook, a transient signal is generated and the relay momentarily operates. Since the L relay only operates from the transient signal generated when the station makes such a transition, it can be used in conjunction with the 'A' lead to distinguish between a hold condition and a disconnect signal. Thus, when the 'A' lead ground is removed by operation of the station hold key, the station network remains across the communication leads; no transient signal is produced; and the L relay remains unoperated. The line circuit is designed to respond to the absence of ground on the 'A' lead and the continued unoperated condition of the L relay by placing the circuit in the hold condition.

In the situation where the subscriber goes on-hook, ground is removed from the 'A' lead and at the same time current is interrupted. The resulting transient momentarily operates the L relay causing the line circuit to respond by placing the circuit in the release or disconnect condition.

A problem is presented in that a number of possible combinations are possible and each must be detected and the proper operation performed. For example, four of the combinations which are possible are:

a. ground disappears from the A lead, L relay remains unoperated (hold);

b. ground appearing on the A lead with L relay operating momentarily followed immediately by ground disappearing from the A lead (initiation of busy state followed by hold);

c. concurrent disappearance of ground from the A lead and L relay operating (station disconnect); and d. L relay operating followed by ground disappearing from the A lead (station disconnect).

Another problem that must be overcome with respect to the hold control circuitry arises from the fact that the hold function must be released under two divergent conditions; namely, (1) when the subscriber at the key station returns from the hold condition by enabling the line pickup key, and (2) when current stops flowing in the central office loop, i.e., open (or shorted) loop condition. However, in the latter case, under certain conditions the central office loop opens periodically at times when it is not desired to release the hold bridge. Accordingly, the hold bridge must be designed to span such intervals and to only release when the central office loop current has stopped flowing for a specific period of time.

Accordingly, it is one object of our invention to provide a hold control circuit operative to detect the presence or absence of ground on the A lead from a telephone station and to match the A lead signal to the transient response signal generated on the communication leads for controlling the hold condition between the station and the switching machine.

It is a further object of our invention to provide a hold control circuit for use in a key telephone line circuit operative to bridge certain switching machine open intervals while responding directly to signals detected on the A lead from the telephone station in conjunction with transient signals generated on the communication leads between the line circuit and the telephone station.

It is a further object of our invention to achieve the above objects in an economical and reliable manner.

SUMMARY OF THE INVENTION

In furtherance of these objectives we have designed a hold control circuit for detecting the presence or absence of the A lead ground and for comparing the detected A lead signal with the transient signal received over the communication leads from the telephone station.

The transient signal is detected by a relay which operates for a certain portion of the transient signal and thereby provides via one of its contacts, a step function signal. Since the transient signal, by definition, only lasts for a finite period of time, as determined by the transient response of the system, its presence must be recorded so that a comparison can be made to the presence or absence of the A lead ground signal. This latter signal can occur either concurrently with or immediately after the completion of the transient signal. Thus, if a disappearing transient signal is not remembered for a short period, then upon the removal of the A lead ground, the hold control circuit would compare the absence of ground with an absence of a transient signal and the circuit would go into the hold condition falsely.

When a transient signal occurs, a capacitor is discharged quickly so that its charge is not available to turn a transistor off when the A lead ground disappears. Thus, when the two events (the transient signal detection and the disappearance of A lead ground) occur concurrently, the transistor remains on and the circuit goes into the disconnect mode. The circuit is arranged so that the capacitor discharges quickly but recharges slowly so that a transient signal which is completed just prior to the detected A lead ground disappearance has the same effect as though the two events occurred simultaneously.

To solve the switching machine disconnect problem, we have arranged a second capacitor in a manner to supply potential for a period of time after a hold current detect relay has released on switching machine open circuit conditions. The capacitor is charged to a voltage level sufficient to hold the control transistor off (thereby keeping the circuit in the hold mode) for a period of time determined by the discharge rate of the capacitor. When the capacitor has discharged below the voltage level to maintain the transistor off, the circuit goes into the disconnect mode. If current begins to flow from the switching machine before the capacitor supplied voltage reaches the transistor turn on voltage, the capacitor recharges and the circuit remains in the hold mode.

When it is desired to have the hold control circuit respond immediately to switching machine open conditions, a diode is used to bias the timing capacitor to the control transistor turn on voltage. Thus, as soon as the hold current detect relay releases, the circuit goes into the disconnect mode.

BRIEF DESCRIPTION OF THE DRAWING

The principles of the invention as well as additional objects and features thereof will be fully appreciated from the illustrative embodiment shown in the drawing, in which:

FIG. 2 is a state condition chart showing the condition of the B and C relays for each circuit state; and FIG. 3 is a chart giving typical resistance and capacitance values, which values should not be taken as in any way limiting the scope of the invention.

DETAILED DESCRIPTION

Figure 1:
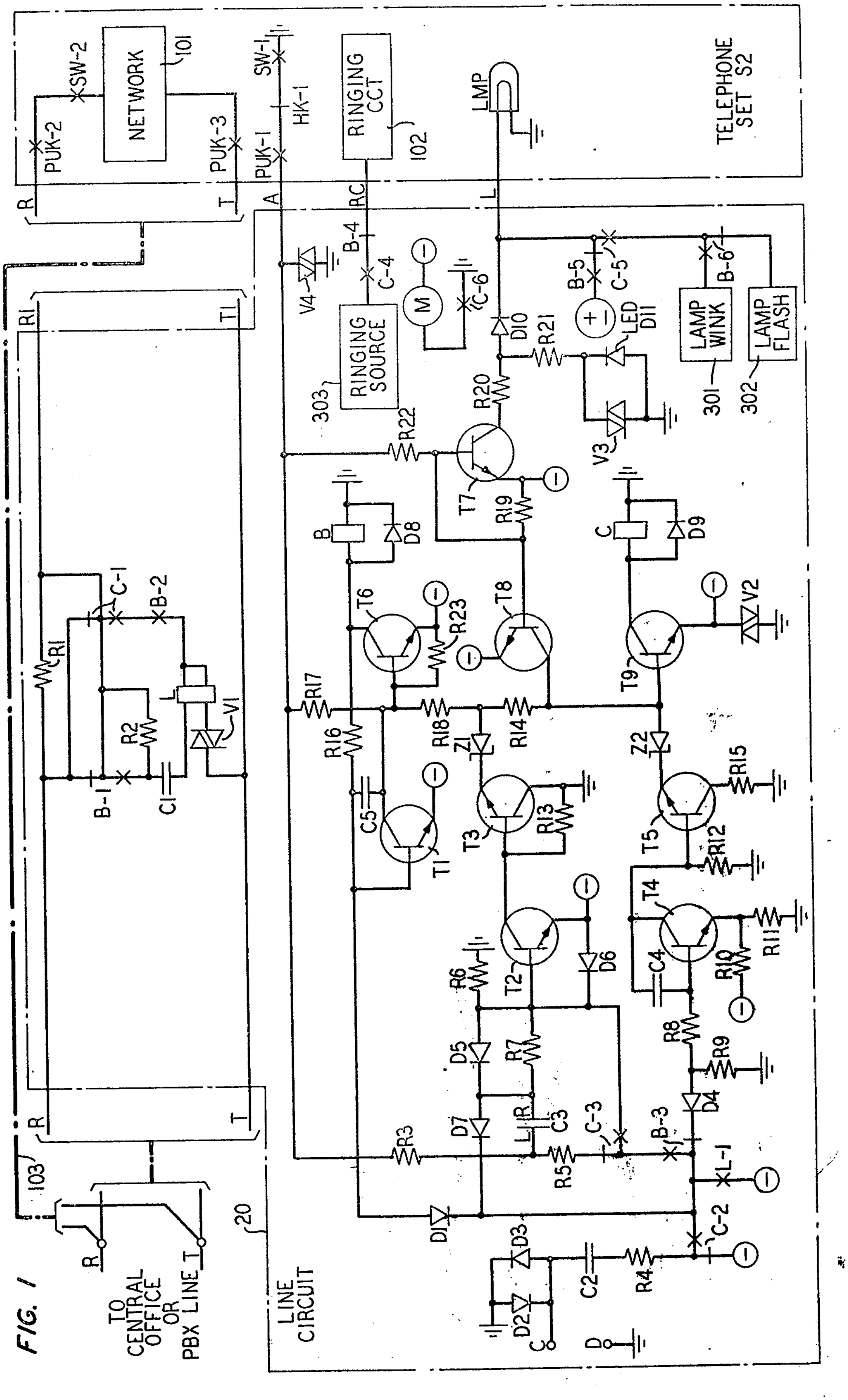
FIG. 1 shows a schematic circuit diagram of the line circuitry in accordance with the invention.

A description of the operation of our invention will be presented in terms of the operation of a line circuit during each significant operating mode and will be presented in accordance with the schematic drawing shown in FIG. 1. The operation modes of the circuit are shown in FIG. 2 where "0" represents the normal or unoperated condition of the associated relay while a "1" represents the operated relay condition.

Circuit Response to Incoming Ringing Signal

When key telephone line circuit 20 shown in FIG. 1 is in the idle condition, relays B and C are both released and all transistors except transistors T1, T2 and T4 are off. Ground from the B relay coil and resistor R16 to the base and battery on the emitter causes transistor T1 to be on. Ground from resistor R6 to the base and battery on the emitter causes transistor T2 to be on. Ground from resistors R9 and R8 to the base and negative potential from resistor divider R10 and R11 on the emitter causes transistor T4 to be on. Transistor T1 is biased in an on condition at this time but no current flows in the collector since the A lead is open.

Operation of the line circuit is initiated by the application of ringing voltage across the T and R communication leads at the central office or other switching point such as a PBX. When ringing voltage is applied, ringing current flows from the R lead of the central office and via break contact B-1 and resistor R2 through capacitor C1, through the series-connected windings of relay L, and through varistor V1 to the T lead from the central office. At this time relay L operates on each cycle of ringing current. When relay L operates, battery is supplied via enabled make contact L-1, released break contact B-3, diode D4 and resistor R8 to the base of transistor T4. Prior to the operation of relay L, capacitor C4 is charged to the collector-base voltage of transistor T4 and, thus, capacitor C4 acts to maintain base drive to transistor T4 for a period of time, preventing transistor T4 from turning off for at least 100 milliseconds after contact L-1 closes. This timing is established to insure that relay L has operated from ringing current supplied and not for some other reason. Thus, capacitor C4 acts to control the initial ring-up timing interval. When capacitor C4 charges to a point where the base of transistor T4 is no longer positive with respect to the emitter voltage, transistor T4 turns off, removing the negative potential from the base of transistor T5 and thereby causing transistor T5, zener diode Z2 and transistor T9 to turn on via base current to transistor T5 supplied through resistor R12. Transistor T9 turning on provides negative potential to operate relay C.

Relay C operated connects ground to motor M start lead by way of enabled make contact C-6 to start the operation of motor M, a motor typically common to groups of line circuits of the type shown. Motor M controls the operation of lamp wink, lamp flash and ringing source circuits 301, 302 and 303, respectively, to provide pulsating voltage potentials for operating the station lamps and ringing circuits. Accordingly, when relay C operates, lamp flash potential is supplied via released break contact B-6, enabled make contact C-5 and over lead L to operate station S2 lamp LMP in a flashing manner. Additionally, the operation of relay C extends interrupted ringing current from ringing source 303 by way of enabled make contact C-4 and unoperated break contact B-4 and the RC lead to station S2 to operate ringing circuit 102. Conventional wiring options, not shown, may be provided so that steady ringing current may be offered as an alternative; or a ground connection may be made available to operate buzzers or other types of audible indicators.

Time-Out Action of Ringup Circuit

Capacitor C2 is charged to negative potential when the circuit is in the idle state via battery from released break contact C-2 and resistor R4. When relays C and L operate, enabled make contacts L-1 and C-2 continue to supply negative potential to maintain the charge. Capacitor C2 is utilized at this time to bridge the silent interval between ringing signals when the L relay is released. This results since upon the release of relay L during the silent interval between ringing voltage pulses, battery is removed via make contact L-1. However, the negative charge on capacitor C2 supplies negative voltage potential to keep transistor T4 off. Thus, transistors T5 and T9 remain on and relay C remains operated. The time constant for discharging capacitor C2 is controlled by resistors R4 and R9 such that, if resistor R9 is selected to be approximately 300 kilohms and capacitor C2 is selected to be 60 mf, relay C will remain operated for approximately five to ten seconds after the release of relay L. If relay L reoperates during this period, capacitor C2 recharges and the circuit remains in the ring state with only relay C operated. If relay L does not reoperate before the voltage level on the base of transistor T4 becomes more positive than the voltage (as provided by the voltage divider of resistors R10 and R11) on the emitter of transistor T4, that transistor turns on, causing transistors T5 and T9 and relay C to go off. The station circuit is then restored to the normal or idle condition.

Answering An Incoming Call — Busy State

An incoming call is answered by operating the conventional pickup key in a telephone set associated with a line being rung and by removing the receiver from the switchhook, thereby placing the station in the off-hook condition. The station or telephone network proper thus makes an on-hook to off-hook transition by becoming connected across the line by way of the operated pickup key contacts and the operated switchhook contact. Ringing is tripped at the central office in the normal manner. At this time ground is also connected through the operated switchhook contact SW-1, released hold key contact HK-1 and operated pickup key contact PUK-1 to the A lead. In all station sets the ground on the A lead appears before the network is connected across the T and R leads. On disconnect, the network is removed from the T and R leads before the A lead ground is removed. As will be seen, this combination of factors is utilized in the design of our circuit.

The A lead ground is supplied to line circuit 20 over the A lead and via resistor R17 to supply collector current to previously turned on transistor T1, causing current to flow in transistor T1. The base of transistor T1 has ground potential thereon via ground through the coil of relay B and resistor R16. Relay B cannot operate at this point because of the resistance value of resistor R16. Transistor T1 being on provides negative potential on the base of transistor T6 keeping that transistor off. Since ground on the A lead at this time represents the station going off-hook, the network is also connected across the T and R leads via pickup key contacts PUK-2 and PUK-3 and enabled switchhook contact SW-2. If this action occurs, a transient is generated between the T and R leads, which transient causes current to flow between the T and R leads via released break contact B-1, resistor R2, capacitor C1, the series connecting windings of relay L, and varistor V1. This transient current causes momentary operation of the L relay.

The L relay operating supplies battery via enabled make contact L-1 and diode D1 to the base of transistor T1, thereby turning off transistor T1. When transistor T1 turns off, ground from the A lead is directed to the base of transistor T6, causing transistor T6 to turn on, thereby operating relay B. Since ground from the A lead is also extended via resistor R22 to the base of transistor T8, that transistor turns on supplying battery to the base of transistor T9 turning off that transistor, thereby causing relay C to release. Thus, the line circuit is in the busy state with relay B operated and relay C released.

When relay B operates, ringing potential is removed from the station via released break contact B-4 and lamp flash is replaced by a steady signal via enabled make contact B-5 and released break contact C-5.

Varistor V1 insures that there is adequate isolation between the T and R leads when the circuit is in the busy state.

Establishing an Outgoing Call — Busy State

The procedure for making an outgoing call is the same as that for answering an incoming call except that transistor T9 and relay C are off at the time when ground is supplied over the A lead.

Holding Function Control

A busy line can be placed in a hold condition by operating the conventional hold key on the telephone set. When the hold key is depressed, ground is disconnected from the A lead. At this point, without further information, line circuit 20 would be unable to determine whether ground disappeared from the A lead because the hold key was operated or because the station went on-hook. However, in key telephone fashion, when the hold key is operated ground is removed from the A lead prior to the release of the network from the T and R leads. Thus, by comparing the A lead operation to the T and R lead operation, a determination can be made as to what condition is desired.

Capacitor C3 is used to monitor the operations with respect to the A lead and the L relay. A number of such operations are possible, namely:

a. ground disappears from the A lead, L relay remains unoperated (hold);
b. ground appearing on the A lead with L relay operating momentarily followed immediately by ground disappearing from the A lead (initiation of busy state followed by hold);

c. concurrent disappearance of ground from the A lead and L relay operating (station disconnect); and d. L relay operating followed by ground disappearing from the A lead (station disconnect).

Each of these situations will now be discussed in detail, keeping in mind the fact that capacitor C3 is used to control the respective functions. When the L relay operates on the establishment of the busy condition, capacitor C3 is partially charged from negative battery via enabled make contact L-1 and diode D7. After enabled make contact L-1 releases, capacitor C3 continues to charge through resistor R7 and the base-emitter junction of transistor T2. Assuming a negative potential of −24 volts, capacitor C3 charges to a voltage of −23.3 volts due to the 0.7 volt base-emitter drop of transistor T2. Transistor T2 is on from current flowing from ground through resistor R6. Since ground from the A lead is on plate L of capacitor C3, that capacitor is charged to −23.3 volts.

Hold Condition

Ground is removed from the A lead via enabled break hold key contact HK-1 while current continues to flow from the T and R leads to the station. Since relay L is ac-coupled to the T and R leads, that relay remains unoperated. Under such a condition, negative voltage is extended via resistors R19, R22, and R3 to the L plate of capacitor C3. However, since an instantaneous change of voltage across capacitor C3 is not possible, current flows through resistor R6 and diode D5 in an attempt to maintain the charge on capacitor C3. Since current is thus no longer available from resistor R6 to drive the base of transistor T2, that transistor turns off. In order to prevent transistor T2 from burning out, diode D6 clamps the voltage at the base of transistor T2 at approximately −24.7 volts. Transistor T2 turning off turns on transistor T3, which latter transistor provides ground via zener diode Z1 to maintain transistor T6 on and to turn on transistor T9 via resistor R14. Relay C thereupon operates. This causes current from the central office to flow through resistor R1, make contacts C-1 and B-2, one coil of relay L and varistor V1 thus causing relay L to operate. Battery is provided via enabled make contacts L-1, B-3 and C-3 to the base of transistor T2 to maintain that transistor off. Since relays B and C are both operated, the line circuit is in the hold condition.

The windings of relay L, resistor R1 and varistor V1 serve as a hold bridge impedance back to the central office and, even though the station network is removed, the communication connection is maintained in an active noncommunicating (hold) condition. At this point, the communication line to the central office is longitudinally balanced to ground, thus eliminating longitudinal voltages which can occur when the impedance on the T lead does not match the impedance on the R lead. When the line circuit is in the hold state with relays B and C operated, lamp wink signals are provided over the L lead via enabled make contacts B-6 and C-5.

Initiation of Busy State Followed Immediately by Hold Signal

As discussed above, as soon as the L relay operates upon the establishment of a connection, either in response to calling signals or because of the initiation by the station, capacitor C3 partially charges very quickly through make contact L-1 as long as that contact is operated. After make contact L-1 releases, capacitor C3 continues to charge at a slower rate through resistor R7. This charge, which takes less than approximately 750 ms, is necessary to insure that the circuit will go into the hold condition if immediately upon the establishment of a connection the A lead ground is removed by operation of hold key contact HK-1. Since capacitor C3 charges quickly, if ground is removed and the L relay remains released, transistor T2 turns off as above discussed and the circuit goes into the hold condition in the manner described.

Station Disconnect

When the circuit is in the busy mode and the station goes on-hook, network 101 is removed from the T and R leads causing a transient which momentarily operates relay L. This on-hook condition is controlled by the release of switchhook contact SW-2 or by the release of pickup key contacts PUK-2 and PUK-3. Also at this time, A lead ground is disconnected via released make switchboard contact SW-1 or via released make pickup key contact PUK-1. Relay L operating provides battery via enabled make contacts L-1 and B-3, resistor R5 and released break contact C-3 to the L plate of capacitor C3 thereby quickly removing the charge from that capacitor, which operation, as will be seen, inhibits the enabling of the hold bridge. When the A lead ground is removed, which event occurs concurrently with or after the operation of relay L, capacitor C3 which is now discharged is unavailable to draw current from resistor R6 as it would do if charged. Thus, upon removal of the A lead ground and the operation of relay L, transistor T2 remains on and transistor T3 remains off. Thus, transistor T6 turns off due to the absence of ground on the A lead, thereby releasing relay B. The circuit is thus returned to the idle state with relay L releasing at the end of the transient interval generated by the off-hook to on-hook transition of the station network.

Station Disconnect — Early Transient

In some situations, station network 101 could be removed from the T and R leads substantially before the A lead ground is removed. The L relay would then operate and release while the ground on the A lead is still present. If the circuit were unable to detect such a premature operation of the L relay, the circuit would go into the hold state upon the removal of the A lead ground since at that time there would be no L relay operation to discharge the C3 capacitor and inhibit the hold bridge enable circuit. This situation is protected against by insuring that capacitor C3 recharges slowly after being discharged by the L relay operation. This is accomplished by recharging capacitor C3 through resistor R7. Thus, even if the A lead ground does not disappear for two seconds after the operation and release of the L relay, the circuit remembers the prior L relay operation and goes into the release condition.

Release of the Holding Bridge by a Station

Assume now that the line circuit is in the hold state with relays B and C operated and with transistor T2 being held off by negative potential on its base via enabled make contacts L-1, B-3 and C-3. When any station of the key telephone system seizes the line circuit by operating the associated pickup key and going off-hook, a ground is again extended over the A lead thereby again turning on transistor T8 causing transistor T9 to turn off, releasing relay C. Relay C releasing removes relay L from the T and R leads via now released make contact C-1. Relay C releasing also allows transistor T2 to turn on via removal of battery from the base of transistor T2 via released make contact C-3. The circuit is thus immediately restored to the busy state with relay B operated via transistor T6 and resistor R17 and with relay C released.

Nonrelease of the Hold Bridge from the Central Office or PBX by Momentary Open Circuit Line Condition As discussed above, when the circuit is in the hold mode, relays B and C are operated and transistor T2 is held off from battery supplied to its base from enabled make contacts L-1, B-3 and C-3. Since relay L is being held operated by loop current flowing in the T and R leads from the central office, when the line current stops flowing relay L releases immediately. The release of relay L serves to remove battery from the base of transistor T2 via now released make contact L-1. However, transistor T2 will remain off until its base becomes 0.7 volt more positive than its emitter. Assuming a connection from terminal D to C, capacitor C2 would have a charge across its plates of −24 volts. Thus, when the L relay releases, the energy stored on capacitor C2 would be discharged via resistor R4, enabled make contacts C-2, B-3 and C-3 to hold transistor T2 off until capacitor C2 discharges 0.7 volt. The discharge rate is controlled by resistor R6, which resistor is selected to give a time delay of 300 milliseconds. If within the 300-millisecond time interval loop current again begins to flow between the T and a leads, relay L reoperates and provides battery via enabled make contact L-1, thereby maintaining transistor T2 off while at the same time recharging capacitor C2.

Release of the Hold Bridge Under Sustained Open Loop Conditions

When the T and R loop is opened for a period of time in excess of the time it takes capacitor C2 to discharge 0.7 volt, transistor T2 turns on thereby turning off transistors T3, T6 and T9, and causing relays B and C to release. The circuit is thus restored to the idle condition.

Immediate Release of Hold Bridge on T and Lead Open Condition

As discussed above, after the release of relay L on an open loop condition, transistor T2 is held off for the period of time it takes capacitor C2 to discharge 0.7 volt. By removing the ground from terminal C (disconnecting terminals D and C) and by substituting for the ground diodes D2 and D3, capacitor C2 becomes charged to 0.7 volt less negative than if ground were on terminal C. Thus, upon the release of relay L capacitor C2 begins to discharge through resistor R6. However, because the starting voltage across capacitor C2 is the same voltage which will allow transistor T2 to turn on without a time delay, transistor T2 turns on immediately. Thus, as soon as relay L releases transistor T2 turns on, turning off transistors T3, T6 and T9 and releasing relays B and C. The circuit is thereby restored to the idle state as soon as the T and R current is broken.

What is claimed is:

1. A hold control circuit for use in a key telephone line circuit for controlling the hold function between a switching machine and at least one telephone station, said line circuit adapted for A lead control between said line circuit and said station, said hold control circuit comprising means for providing a momentary station transition signal whenever any of said telephone stations makes a transition from an on-hook to off-hook condition or from an off-hook to on-hook condition, means for detecting the presence or absence of a signal on said A lead, means for providing a hold bridge enable signal upon a detected transition from the presence of a said signal on said A lead to an absence of said A lead signal and a concurrent absence of a said momentary station transition signal, and means for inhibiting said hold bridge enable signal and for providing a station disconnect signal upon a detected transition from a signal on said A lead to an absence of said A lead signal and a concurrent momentary station transition signal.

2. The invention set forth in claim 1 further comprising means for enabling said inhibiting and station disconnect signal means upon a detected transition from a signal on said A lead to an absence of said A lead signal and a completed momentary station transition signal.

3. The invention set forth in claim 2 wherein said hold bridge enable signal means and said hold bridge inhibiting and station disconnect signal means include:

a transistor;

means including a capacitor for establishing a first voltage on the base of said transistor sufficient to maintain said transistor in an on condition, thereby to control said inhibiting and station disconnect signal means;

means including a first capacitor for establishing a second voltage on the base of said transistor sufficient to turn said transistor off, thereby to control said hold bridge enable signal means;

said first voltage being established in response to a detected presence of said A lead signal and a said momentary station transition signal; and said second voltage being established in response to said detected transition from said presence of said A lead signal to an absence of said A lead signal.

4. The invention set forth in claim 3 further comprising:

means for detecting continued current flow from said switching machine;

means for controlling the enabling of said inhibiting and station disconnect means in response to said detected continued current flow, said controlling means including means operable in response to a detected continued current flow for providing said second voltage to said base of said transistor to keep said transistor off, thereby maintaining said hold bridge enabling means in an enabled condition, means operable in response to a detected absence of said detected continued current flow for substituting said first voltage for said second voltage on the base of said transistor to turn said transistor on, thereby enabling said inhibiting and station disconnect means;

said substituting means including a second capacitor for establishing a time delay period between the provision of said second and first voltages on said transistor base and the provision of said first voltage on said transistor base, thereby maintaining said transistor off for said delay period; and means for adjusting the voltage level across said second capacitor, thereby adjusting said delay period.

5. The invention set forth in claim 4 further comprising a pair of diodes and wherein said pair of diodes is adapted for adjusting said voltage level to a value equal to said first voltage, thereby eliminating said delay period.

* * * * *